US011993270B2

United States Patent
Kuehnle et al.

(10) Patent No.: US 11,993,270 B2
(45) Date of Patent: May 28, 2024

(54) SYSTEM AND METHOD FOR DRIVING STYLE DRIVER IDENTITY DETERMINATION AND CONTROL OF VEHICLE FUNCTIONS

(71) Applicant: Bendix Commercial Vehicle Systems, LLC, Elyria, OH (US)

(72) Inventors: Andreas U. Kuehnle, Villa Park, CA (US); Zheng Li, Irvine, CA (US); Karl H. Jones, Elyria, OH (US); Eric E. Bloam, Elyria, OH (US)

(73) Assignee: Bendix Commercial Vehicle Systems, LLC, Avon, OH (US)

( * ) Notice: Subject to any disclaimer, the term of this patent is extended or adjusted under 35 U.S.C. 154(b) by 286 days.

(21) Appl. No.: 17/542,054

(22) Filed: Dec. 3, 2021

(65) Prior Publication Data

US 2023/0174075 A1    Jun. 8, 2023

(51) Int. Cl.
*B60W 40/09* (2012.01)
*B60W 50/00* (2006.01)
*G06F 16/2457* (2019.01)
*G06V 20/59* (2022.01)
*G06V 40/16* (2022.01)

(52) U.S. Cl.
CPC ........ *B60W 40/09* (2013.01); *B60W 50/0098* (2013.01); *G06F 16/24578* (2019.01); *G06V 20/597* (2022.01); *G06V 40/172* (2022.01); *B60W 2050/0083* (2013.01); *B60W 2420/403* (2013.01); *B60W 2540/043* (2020.02); *B60W 2540/30* (2013.01)

(58) Field of Classification Search
CPC . B60W 40/09; G08G 1/096883; G08G 1/017; B60N 2/0248; H04L 67/306; H04L 67/12; B60R 25/20; G06Q 10/06; B60K 35/00
See application file for complete search history.

(56) References Cited

U.S. PATENT DOCUMENTS 8,344,849 B2   1/2013  Larsson et al.
9,418,491 B2   8/2016  Phillips
(Continued)

FOREIGN PATENT DOCUMENTS

CN   105489021 A  *  4/2016  ............. G08G 1/017
CN   102467762 B     6/2016
(Continued)

*Primary Examiner* — Yuri Kan
(74) *Attorney, Agent, or Firm* — Crowell & Moring LLP

(57) ABSTRACT

A system for controlling a vehicle based on a driving style determined driver identity includes sensors that capture driving-style-based data characterizing a driving style of an unknown driver. The system also includes a control unit that determines a driving style vector of the unknown driver from the captured driving-style-based data. The control unit compares the driving style vector of the unknown driver to driving style vectors of a plurality of known drivers to generate a similarity score for each of the plurality of known drivers. The control unit ranks the plurality of known drivers according to their respective similarity scores, and identifies the unknown driver as at least one of the ranked known drivers based on the respective similarity scores. The control unit controls vehicle systems based on the identification of the unknown driver.

19 Claims, 4 Drawing Sheets

(56) References Cited

U.S. PATENT DOCUMENTS

| | | | |
|---|---|---|---|
| 11,014,567 B1* | 5/2021 | Fields | B60W 40/09 |
| 11,199,142 B2* | 12/2021 | Kolhouse | G06Q 10/06 |
| 2010/0125387 A1* | 5/2010 | Sehyun | H04L 67/12 |
| | | | 715/745 |
| 2012/0226421 A1* | 9/2012 | Kote | B60R 25/20 |
| | | | 701/1 |
| 2014/0012976 A1* | 1/2014 | Christodorescu | H04L 67/306 |
| | | | 709/224 |
| 2017/0057438 A1* | 3/2017 | Dow | B60N 2/0248 |
| 2018/0012092 A1 | 1/2018 | Gleeson-May et al. | |
| 2019/0193751 A1* | 6/2019 | Fernando | G08G 1/096883 |

FOREIGN PATENT DOCUMENTS

| | | | | |
|---|---|---|---|---|
| CN | 105844227 A | | 8/2016 | |
| CN | 107170331 A | | 9/2017 | |
| CN | 107215307 A | * | 9/2017 | ............ B60R 25/20 |
| CN | 107526906 A | | 12/2017 | |
| CN | 108009463 A | | 5/2018 | |
| CN | 108647630 A | | 10/2018 | |
| DE | 10 2006 054 574 B4 | | 10/2008 | |
| DE | 10 2006 053 328 B4 | | 12/2008 | |
| DE | 10 2014 003 194 A1 | | 9/2014 | |
| JP | 2015230548 A | * | 12/2015 | ............ B60K 35/00 |
| JP | 2018-73374 A | | 5/2018 | |
| KR | 10-2015-0044199 A | | 4/2015 | |
| WO | WO 2018/148897 A1 | | 8/2018 | |

\* cited by examiner

SYSTEM AND METHOD FOR DRIVING STYLE DRIVER IDENTITY DETERMINATION AND CONTROL OF VEHICLE FUNCTIONS

FIELD OF THE INVENTION

The invention relates to improvements in systems and methods for controlling vehicle functions based on monitored driving style, and in particular based on a driver identity determined based on the monitored driving style.

BACKGROUND

In commercial vehicle fleets, and other driving circumstances, it is important to know who is driving the vehicle. Remote vehicle driver identification, however, is an inexact art. It is not currently possible to be sure that the person believed to be driving is doing so.

The identity of the driver can, for example, be determined via a vehicle telematics log-in procedure. The driver typically has an identification card with a barcode or other scannable image that is scanned to identify the driver. Alternatively, the driver may be required to enter a user ID and/or password via a keypad. However, driver identification via telematics log-in is unreliable for several reasons, including that the diver may have not logged-in properly, the system may not transmit the log-in data, the log-in data may be corrupted, faked, or incorrect.

The identity of the driver can also, for example, be established with a driver facing camera or other biometric means. Camera-based biometric measurements (e.g., facial features) are made from the camera image, and then compared with a set of possible drivers and their associated biometric characteristics. Those drivers with sufficiently close biometric measures are determined to be the probable drivers. However, there will very rarely be perfect alignment between the stored, named, biometric data and the data measured by the camera (or other biometric sensors).

Thus, the current methods for establishing driver identity are insufficient. There is a need in the art for systems and methods that overcome at least these deficiencies.

SUMMARY OF THE INVENTION

Systems and methods are therefore proposed for driving style based driver identity determination. The embodiments disclosed herein are based on the observation that drivers drive in noticeably different ways. For example, there is the classic 'lead-foot' speeder, the 'darter' who frequently changes lanes, the 'ecowarrior' who regularly coasts/engine brakes, the 'hesitater' who timidly changes lanes, and so on. Unknown drivers can therefore be identified by comparing observed driving styles with a database of reference driving styles of previously identified drivers (i.e., known drivers).

The top n known drivers whose driving styles match the observed driving style of the unknown driver can be ranked and associated with data collected during the driving excursion of the unknown driver (e.g., detected safety events). Storing the multiple probable identities, robustifies data recordings and scoring, and can provide a backup when a mistaken identity is registered.

Where the driving styles correspond such that one known driver can be identified as the unknown driver, the stored biometric data of the known driver can be updated accordingly with any newly captured biometric data—thus improving the accuracy of the biometric data driver identification. One or more vehicle systems may also be controlled in accordance with the driver identification.

Other objects, advantages and novel features of the present invention will become apparent from the following detailed description of one or more preferred embodiments when considered in conjunction with the accompanying drawings.

DESCRIPTION OF EXEMPLARY EMBODIMENTS OF THE INVENTION

Figure 1:
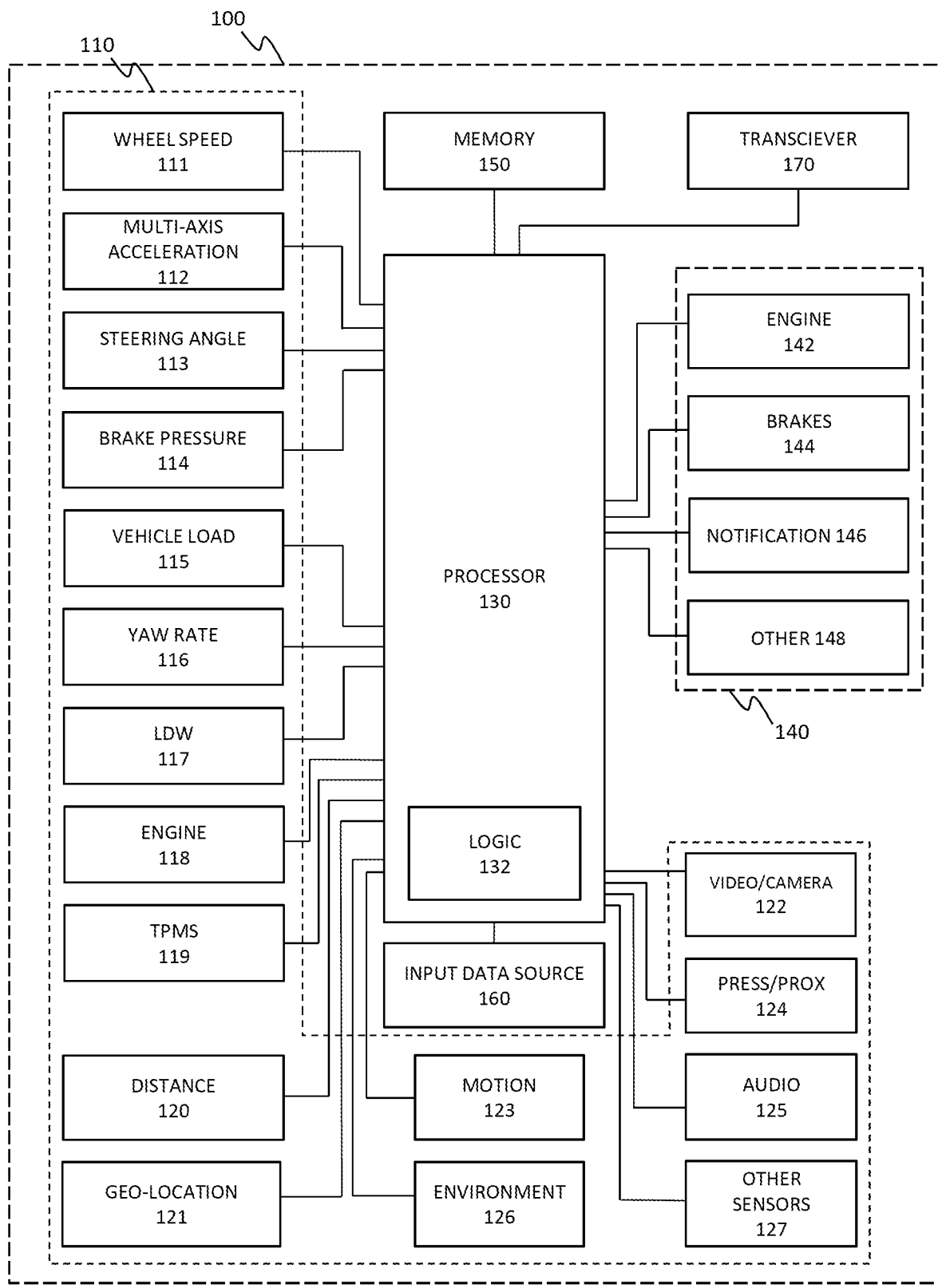
FIG. 1 is a schematic illustration of an exemplary system, in accordance with one or more aspects of the invention.

The above described drawing figures illustrate the present invention in at least one embodiment, which is further defined in detail in the following description. Those having ordinary skill in the art may be able to make alterations and modifications to what is described herein without departing from its spirit and scope. While the present invention is susceptible of embodiment in many different forms, there is shown in the drawings and will herein be described in detail at least one preferred embodiment of the invention with the understanding that the present disclosure is to be considered as an exemplification of the principles of the present invention, and is not intended to limit the broad aspects of the present invention to any embodiment illustrated.

Further in accordance with the practices of persons skilled in the art, aspects of one or more embodiments are described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, code segments perform certain tasks described herein. The code segments can be stored in a processor readable medium. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

In the following detailed description and corresponding figures, numerous specific details are set forth in order to provide a thorough understanding of the present invention. However, it should be appreciated that the invention may be practiced without such specific details. Additionally, well-known methods, procedures, components, and circuits have not been described in detail.

As used herein, the terms "a" or "an" shall mean one or more than one. The term "plurality" shall mean two or more than two. The term "another" is defined as a second or more.

The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

The term "server" means a functionally-related group of electrical components, such as a computer system that may or may not be connected to a network and which may include both hardware and software components, or alternatively only the software components that, when executed, carry out certain functions. The "server" may be further integrated with a database management system and one or more associated databases.

In accordance with the descriptions herein, the term "computer readable medium," as used herein, refers to any non-transitory media that participates in providing instructions to the processor for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like.

In addition, and further in accordance with the descriptions herein, the term "logic," as used herein, particularly with respect to FIG. 1, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

The invention relates generally to systems and methods for driving style based driver identity determination and vehicle control based thereon. In certain embodiments, the invention may be implemented by an on-vehicle event detection and reporting system. The event detection and reporting system may be configured to collect and provide event-based data corresponding to detected driver and/or vehicle related events occurring during a driving excursion, or even outside of the driving excursion. The event-based data can include vehicle and/or driver related data collected from components of, or components interacting with, the event detection and reporting system, including but not limited to vehicle devices, sensors and/or systems. It will be understood that, while aspects and embodiments are occasionally described herein in terms of the driver, or in terms of being driver related, such aspects and embodiments are also generally applicable to passengers in lieu of or in addition to drivers, except as will be apparent to those of ordinary skill.

The components may include one or more driver facing cameras configured such that the field of view of the camera(s) captures a view the driver of the vehicle, and/or a view of other areas of the cabin, such as the driver controls of the vehicle while driving and non-driver passenger areas. Other cameras may be configured to capture other scenes relative to the vehicle, including but not limited to scenes in front of the vehicle, behind the vehicle, to either side of the vehicle, etc.

The components may further include vehicle devices, sensors and/or systems configured to provide non-video data, including non-video event-based data corresponding to driver and/or vehicle related events. Such components may include one or more microphones, independent or in connection with the cameras, configured to capture audio recordings of areas of the cabin and/or other vehicle areas (e.g., engine noise, etc.).

Accordingly, the event detection and reporting system can detect, in real time, the driver and/or vehicle related events from the collected event data. The event data therefore can include data from which events can be detected will be appreciated, but can also include data that corresponds to the detected event but is not used to detect the event. The events and/or the event data can be recorded, stored, reported to, collected by, or otherwise communicated internally and/or externally by the event detection and reporting system Examples of events that may be detected and/or reported to/collected by the event detection and reporting system include but are not limited to: safety events, for example and without limitation, excessive acceleration, excessive braking, exceeding speed limit, excessive curve speed, excessive lane departure, lane change without turn signal, loss of video tracking, LDW system warning, following distance (i.e., headway) alert, forward collision warning, collision mitigation braking, collision occurrence, etc., and non-safety events, for example and without limitation, the driver logging in/out of a vehicle telematics system, the driver/passenger entering/leaving the vehicle, the driver/passenger occupying/vacating the bunk area, the driver occupying/vacating the driver seat, the vehicle engine being on/off, the vehicle gear being in park/drive, the parking brake being on/off, etc. Non-safety events may also include theft events, for example and without limitation, the presence of an unauthorized occupant accessing the vehicle, etc.

The event detection and reporting system may use event data collected directly from vehicle devices, sensors, and/or systems, which may include event data collected from an analysis of vehicle video, to generate event datasets that correspond in time with one or more detected events. Event data generated for a detected event may be associated with captured video frames whose timeline spans or overlaps the time when the event was detected/collected. Event data generated from an event determined from processing of captured vehicle video may at least be associated with the video from which it was generated, but may also be associated with other captured video frames whose timelines span or overlap the time when the event was detected/collected (in these scenarios, the time may be calculated based on the video frame or frames from which the event object was derived). For example, video frames from a side-looking camera may be relevant to detecting a cut-in event, in response to which excessive braking of the vehicle may also be detected. Video frames from a driver-facing camera may then be relevant to, for example, determine whether the driver was aware of the passing vehicle prior to its cutting in, and therefore whether the driver could have performed better or differently.

The event detection and reporting system may be further configured to collect and provide driving style-based data corresponding to detected style characteristics of driving performance during one or more driving excursions. Similar to the event-based data, the style-based data can include vehicle and/or driver related data collected from components of, or components interacting with, the event detection and reporting system, including but not limited to vehicle devices, sensors and/or systems. The event detection and reporting system may also use the style-based data to detect one or more driving style characteristics, and to generate associated datasets that characterize the one or more detected driving style characteristics.

Accordingly, the components, individually and collectively, may be configured to detect, in real time, the driving styles of respective drivers, and to generate style vectors characterizing the driving styles therefrom. The generated style vectors may comprise one or more vector components, each reflecting a respective value for an associated driving style characteristic. Each driving style characteristic may further reflect a pattern of driving behavior under associated circumstances related to the environment of the driving excursions, including for example, weather, road conditions, time of day, traffic conditions, etc.

Examples of driving style characteristics include but are not limited to: head position behavior (e.g., mirror, blind spot, etc., checking), speed behavior (mph above/below posted speed limit, etc.), distance behavior (e.g., following, lateral, rearward, etc., distances from vehicles, objects, lane markers, etc.), driving smoothness, gear shifting behavior, braking behavior (e.g., traditional, engine, exhaust, and/or Jake braking behavior), lane changing behavior (e.g., signaling, blind spot and mirror checking, etc.), lane choice and positioning, steering behavior, acceleration behavior (e.g., throttle usage, etc.), cruise control usage, reaction times and actions, etc.—and any other indicator tending to characterize driving style. These style characteristics can also be associated with various detected circumstances related to the environment of the driving excursions, including for example, weather, road conditions, time of day, traffic conditions, road conditions, etc., in order to further gradate driving styles with respect to various drivers.

It is of particular interest to detect and record which drivers and/or driving teams are driving during various situations. The event detection and reporting system may therefore be further configured to store one or more records of the detected events and/or the data sets generated in association therewith as corresponding to individual drivers and/or driving teams detected during the driving excursion, a period thereof, or otherwise during a timespan associated with the driving excursion (e.g., recently prior or subsequent to the driving excursion). As used herein, a "driving team" refers to one or more individuals, each of whom at any time during the driving excursion may be the driver or the passenger, but for which there is at least one driver at any given time.

The detection of drivers and/or driving teams may be via vehicle telematics log-in, facial recognition, biometric data recognition, or any other mechanism or process—which may identify the detected driver and associate the driver with driver identification data (e.g., a personal ID number, etc.). The detection of drivers and/or driving teams may alternatively or additionally be according to an analysis of the detected driving style characteristics. Such driving style driver detection may be relied on to supplement and/or replace detection by other driver detection methods (e.g., facial recognition, biometric recognition, telematics log-in, etc.), particularly when such identification methods (and/or components used therewith) are determined to be unreliable and/or unavailable. Accordingly, events may be detected, recorded and reported as associated with the appropriate driver(s) and/or driving team(s) based at least partially on the driving style determined driver identity.

The event detection and reporting system may further be configured to control one or more vehicle systems in response to detected events. Examples of such control include but are not limited to: providing one or more types of warnings (e.g., driver assistance system warnings, warnings to passengers in the cabin that the driver requires assistance, etc.), intervening in the operation of the vehicle (e.g., to initiate corrective action, to activate harm mitigating features, to assume autonomous control, etc.), and alerting remote locations/devices (e.g., backend servers, dispatch center computers, mobile devices, etc.) of detected events. A variety of corrective actions may be possible and multiple corrective actions may be initiated at the same time. Accordingly, in at least some embodiments, the invention relates to the control of vehicle systems based on driving style determined driver identity, particularly with respect to driving teams of differing ability and/or assistance needs. For example, the system may automatically provide driver and/or driving team specific warnings, assistance, adaptations, and/or other types of control.

Referring to FIG. 1, by way of overview a schematic block diagram is provided illustrating details of an event detection and reporting system 100 configured to be used in accordance with one or more embodiments. The event detection and reporting system 100 may be adapted to detect a variety of operational parameters and conditions of the vehicle and the driver's interaction therewith (i.e., event-based data, etc.) and, based thereon, to determine if a driving and/or vehicle event has occurred (e.g., if one or more operational parameter/condition thresholds has been exceeded). The data related to detected events (i.e., event-based data or data sets) may then be stored and/or transmitted to a remote location/device (e.g., backend server, dispatch center computer, mobile device, etc.), and one or more vehicle systems can be controlled based thereon.

The event detection and reporting system 100 may include one or more devices or systems 110 for providing vehicle and/or driver related data, including data indicative of one or more operating parameters or one or more conditions of a commercial vehicle, its surroundings and/or its cabin occupants. Such vehicle and/or driver related data can include style-based data indicative of driving style. The event detection and reporting system 100 may, alternatively or additionally, include a signal interface for receiving signals from the one or more devices or systems 110, which may be configured separate from system 100. For example, the devices 110 may be one or more sensors, such as but not limited to, one or more wheel speed sensors 111, one or more acceleration sensors such as multi-axis acceleration sensors 112, a steering angle sensor 113, a brake pressure sensor 114, one or more vehicle load sensors 115, a yaw rate sensor 116, a lane departure warning (LDW) sensor or system 117, one or more engine speed or condition sensors 118, and a tire pressure (TPMS) monitoring system 119. The event detection and reporting system 100 may also utilize additional devices or sensors, including for example a forward/lateral/rear distance sensor 120 (e.g., radar, lidar, etc.) and/or a geo-location sensor 121. Additional sensors for capturing driver related data may include one or more video sensors 122 and/or motion sensors 123, pressure or proximity sensors 124 located in one or more seats and/or driver controls (e.g., steering wheel, pedals, etc.), audio sensors 125, or other sensors configured to capture driver related data. The event detection and reporting system 100 may also utilize environmental sensors 126 for detecting circumstances related to the environment of the driving excursion, including for example, weather, road conditions, time of day, traffic conditions, etc. (i.e., environment-based data). Other sensors 127, actuators and/or devices or combinations thereof may be used or otherwise provided as well, and one or more devices or sensors may be combined into a single unit as may be necessary and/or desired. For example, biometric sensors may be included for detecting biometric data of the vehicle occupants.

The event detection and reporting system 100 may also include a logic applying arrangement such as a controller or processor 130 and control logic 132, in communication with the one or more devices or systems. The processor 130 may include one or more inputs for receiving data from the devices or systems. The processor 130 may be adapted to process the data and compare the raw or processed data to one or more stored threshold values or desired averages or value ranges, or to process the data and compare the raw or processed data to one or more circumstance-dependent desired values, so as to detect one or more driver and/or vehicle related events.

The processor 130 may also include one or more outputs for delivering a control signal to one or more vehicle control systems 140 based on the detection of the event(s) and/or in response to vehicle and/or driver related data. The control signal may instruct the systems 140 to provide one or more types of driver assistance warnings (e.g., warnings relating to braking, obstacle avoidance, etc.) and/or to intervene in the operation of the vehicle to initiate corrective action. For example, the processor 130 may generate and send the control signal to an engine electronic control unit 142 or an actuating device to reduce the engine throttle and slow the vehicle down. Further, the processor 130 may send the control signal to one or more vehicle brake systems 144 to selectively engage the brakes (e.g., a differential braking operation). A variety of corrective actions may be possible and multiple corrective actions may be initiated at the same time. Such corrective actions need not be contemporaneous with detected events and/or event data, and may, additionally or alternatively, be responsive to one or more historical records of detected events and/or event data.

The vehicle control components may include brake light (s) and other notification devices 146, which may be configured to provide warnings and/or notifications externally to the vehicle surroundings and/or internally to the vehicle occupants. Example warnings and/or notifications include: headway time/safe following distance warnings, lane departure warnings, warnings relating to braking and or obstacle avoidance events, and any other type of warning or notification in furtherance of the embodiments described herein. Other vehicle control systems 148 may also be controlled in response to detected events and/or event data.

The event detection and reporting system 100 may also include a memory portion 150 for storing and accessing system information, such as for example the system control logic 132. The memory portion 150, however, may be separate from the processor 130. The sensors 110, controls 140 and/or processor 130 may be part of a preexisting system or use components of a preexisting system.

The event detection and reporting system 100 may also include a source of vehicle-related input data 160, which may be indicative of a configuration/condition of the commercial vehicle and/or its environmental circumstances (e.g., road conditions, geographic area conditions, etc.). The processor 130 may sense or estimate the configuration/ condition and/or the environmental circumstances of the vehicle based on the input data, and may select a control tuning or control sensitivity setting based on the vehicle configuration/condition and/or environmental circumstances. The processor 130 may compare the operational data received from the sensors 110 to the information provided by the control tuning. Such input data may be further useful in evaluating driving style, as described herein. For example, the driving styles of one or more drivers may be evaluated with respect to common environmental circumstances (e.g. night, rain, wind).

In addition, the event detection and reporting system 100 may be operatively coupled with one or more driver facing imaging devices, shown for simplicity and ease of illustration as a single driver facing camera 122 that is trained on the driver and/or trained on the interior of the cab of the commercial vehicle. However, it should be appreciated that one or more physical video cameras may be disposed on the vehicle such as, for example, a video camera on each corner of the vehicle, one or more cameras mounted remotely and in operative communication with the event detection and reporting system 100 such as a forward facing camera 122 to record images of the roadway ahead of the vehicle. Such cameras may, for instance, indicate proximity to objects, the roadway verge, etc.

In some embodiments, driver related data can be collected directly using the driver facing camera 122, such driver related data including head position, eye gaze, hand position, postural attitude and location, or the like, within the vehicle. In addition, driver identity and/or presence can be determined based on facial recognition technology, body/ posture template matching, and/or any other technology or methodology for making such determinations by analyzing video data.

In operation, the driver facing camera 122 may video data of the captured image area. The video data may be captured on a continuous basis, or in response to a detected event. Such data may comprise a sequence of video frames with separate but associated sensor data that has been collected from one or more on-vehicle sensors or devices, as detailed herein.

The event detection and reporting system 100 may also include a transmitter/receiver (transceiver) module 170 such as, for example, a radio frequency (RF) transmitter including one or more antennas for wireless communication of data and control signals, including control requests, event-based data, style-based data, vehicle configuration/condition data, or the like, between the vehicle and one or more remote locations/devices, such as, for example, backend servers, dispatch center computers, and mobile devices, having a corresponding receiver and antenna. The transmitter/receiver (transceiver) module 170 may include various functional parts of sub portions operatively coupled with a platoon control unit including for example a communication receiver portion, a global position sensor (GPS) receiver portion, and a communication transmitter. For communication of specific information and/or data, the communication receiver and transmitter portions may include one or more functional and/or operational communication interface portions as well.

The processor 130 may be operative to select and combine signals from the sensor systems into event-based data and/or style-based data representative of higher level vehicle and/or driver related data. For example, data from the multi-axis acceleration sensors 112 may be combined with the data from the steering angle sensor 113 to determine excessive curve speed event data. Other hybrid data relatable to the vehicle and/or driver and obtainable from combining one or more selected raw data items from the sensors includes, for example and without limitation, excessive braking event data, excessive curve speed event data, lane departure warning event data, excessive lane departure event data, lane change without turn signal event data, lane change without mirror usage data, loss of video tracking event data, LDW system disabled event data, distance alert event data, forward collision warning event data, haptic warning event data, collision mitigation braking event data, ATC event data, ESC event data, RSC event data, ABS event data, TPMS event data, engine system event data, following distance event data, fuel consumption event data, ACC usage event data, and late speed adaptation (such as that given by signage or exiting). Still other hybrid data relatable to the vehicle and/or driver and obtainable from combining one or more selected raw data items from the sensors includes, for example and without limitation, driver out of position event data, passenger out of position event data, driver distracted event data, driver drowsy event data, driver hand(s) not on wheel event data, passenger detected event data, wrong driver event data, seatbelt not fastened event data, driver cellphone use event data, distracting passenger event data, mirror non-use event data, unsatisfactory equipment use event, driver smoking event data, passenger smoking event data, insufficient event response event data, insufficient forward attention event data. The aforementioned events are illustrative of the wide range of events that can be monitored for and detected by the event detection and reporting system 100, and should not be understood as limiting in any way.

The event detection and reporting system 100 may further include a bus or other communication mechanism for communicating information, coupled with the processor 130 for processing information. The system may also include a main memory 150, such as random access memory (RAM) or other dynamic storage device for storing instructions and/or loaded portions of a trained neural network to be executed by the processor 130, as well as a read only memory (ROM) or other static storage device for storing other static information and instructions for the processor 130. Other storage devices may also suitably be provided for storing information and instructions as necessary or desired.

In at least some embodiments, the event detection and reporting system 100 of FIG. 1 is configured to execute one or more software systems or modules that perform or otherwise cause the performance of one or more features and aspects described herein. Computer executable instructions may therefore be read into the main memory 150 from another computer-readable medium, such as another storage device, or via the transceiver 170. Execution of the instructions contained in main memory 150 may cause the processor 130 to perform one or more of the process steps described herein. In some embodiments, hard-wired circuitry may be used in place of or in combination with software instructions to implement the invention. Thus, implementations of the example embodiments are not limited to any specific combination of hardware circuitry and software.

Figure 2:
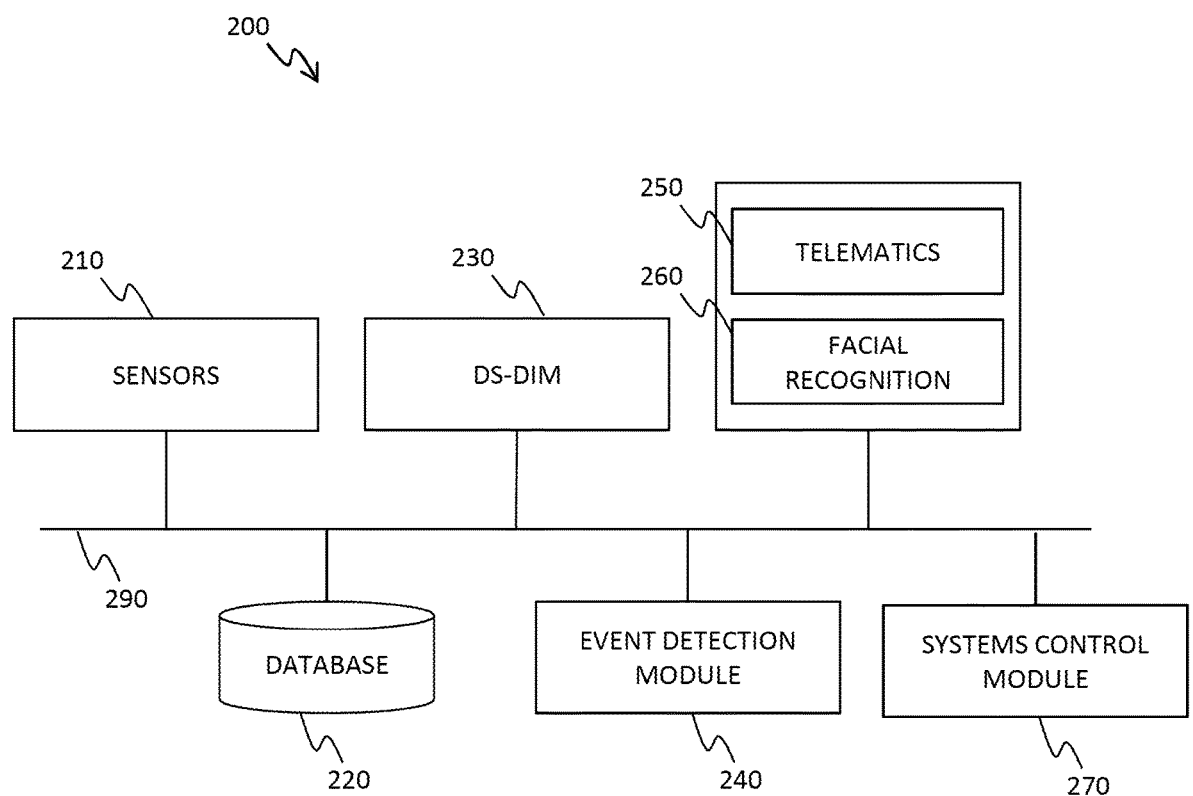
FIG. 2 is a block diagram that illustrates an exemplary system architecture, in accordance with one or more aspects of the invention.

FIG. 2 is a schematic block diagram depicting an exemplary system architecture 200 for driving style based driver identity determination and vehicle control based thereon, in accordance with at least one embodiment. The system architecture may be implemented via the event detection and reporting system of FIG. 1, and may include one or more functional modules. The functional modules depicted may be embodied by one or more processors, alone or in combination with other system components, executing one or more software applications so as to configure the processors to implement the described functions, or otherwise cause the implementation of such functions via other system components. The functional modules may further be embodied on-vehicle and/or off-vehicle (e.g., at the remote server system), in part or in whole.

The system architecture may include one or more sensors and/or sensor systems ("sensors") 210 configured to detect at least driving style characteristics during one or more excursions, and to generate style-based data therefrom characterizing at least the detected driving style. The sensors 210 may include sensors, devices or systems 110 discussed with reference to FIG. 1. The sensors 210 may further include corresponding sensor modules for configuring the sensors for the functions described herein.

The sensors 210 may be communicatively coupled to a database 220 via a system bus 290. The database 240 may be configured to store and otherwise manage data and information, including but not limited to, for example, driving style-based data, event-based data, environment-based data, style-vectors, driver identification data, and relationships therebetween, in furtherance of the functions described herein.

The system architecture may further include a driving style driver identification module 230 (DS-DIM), which may be embodied in processor 130 or may be embodied in one or more processors at the one or more remote locations/devices (e.g., remote server system). The DS-DIM 230 may be configured to analyze the driving style-based data so as to determine, updated and/or otherwise manage the respective driving styles of various drivers. The driving styles may correspond to one or more generated driving style vectors 232 characterizing the driving style of respective drivers.

Figure 3:
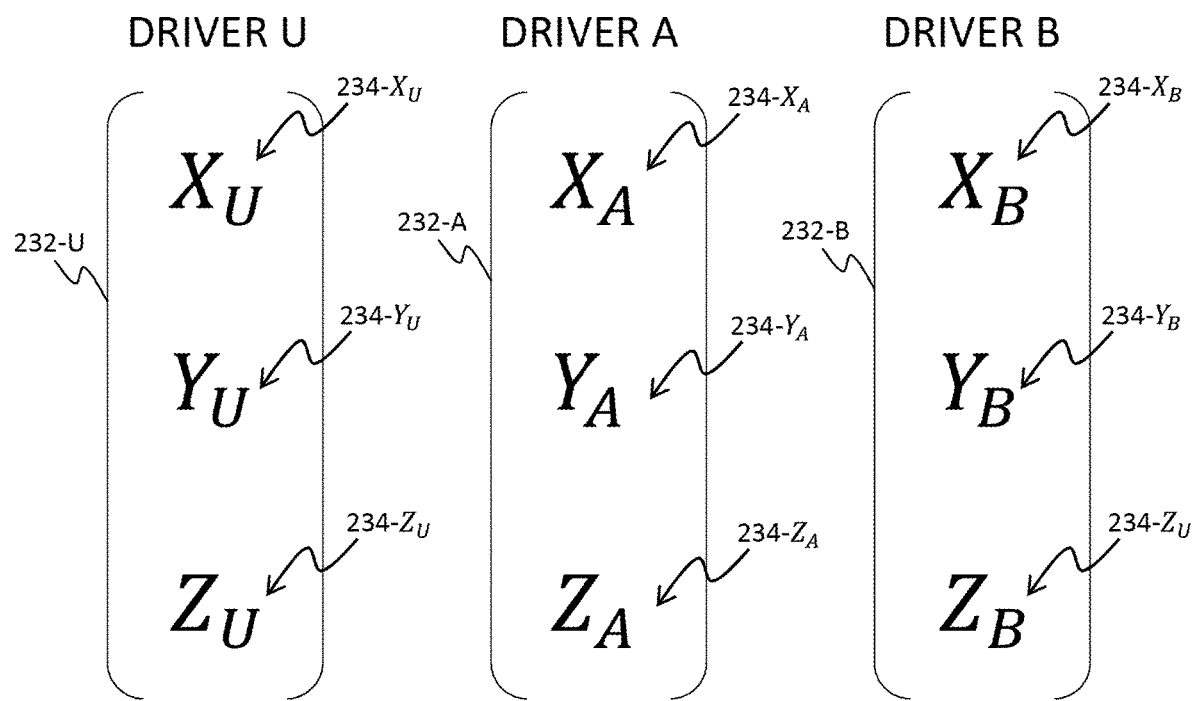
FIG. 3 are diagrams illustrating driving style vectors in accordance with one or more aspects of the invention.

FIG. 3 schematically illustrates exemplary driving style vectors 232. Each driving style vector 232 may comprise one or more vector components 234, each corresponding to a unique driving style characteristic, which may be predetermined. For example, the driving style vector may comprise vector components for average following distance or time, average mph above/below the posted speed limit, rate of lane changes without signaling, standard deviation of lane position (SDLP), median active acceleration value, etc., and/or for any other metric that tends to characterize driving style. The values for each vector component 234 correspond to values of the associated driving style characteristic determined by analyzing at least the driving style-based data. Other data may be analyzed to determine the values of vector components 234, including event-based data and environment-based data. The values may also be normalized.

For example, as shown in FIG. 3, a first driving style vector 232-A and a second driving style vector 232-B may respectively characterize the driving styles associated with a known first driver A and a known second driver B, whereas a third driving style vector 232-U may characterize the driving style of an unknown driver U. The values for the vector components 234 may correspond to the values of the one or more driving style characteristics, such that vector component 234-$X_A$ has a value $X_A$ that represents the value of driving style characteristic X for first driver A, and so on for each driver. Additional vectors may be generated for additional drivers. Thus, each style vector represents the determined driving style of the associated driver in vector form.

In some embodiments, driving style characteristics comprises time-free patterns and/or time-bound patterns. Time-free patterns are not bounded by time, such as for example, average speed, etc. Time-bound patters are bounded by time, such as for example, average speed at night, etc. For example, it can be determined whether the driver drives the same every day or drives very differently from time-to-time. Driving style characteristics may also comprise paired patterns of inputs and reactions to the inputs. Input patterns may reflect circumstances to which the driver reacts, such as for example, a quickly braking forward vehicle, distracting passenger, etc. Reaction patterns reflect how the driver reacts to specific input patterns, such as for example, swerving, slowing, etc. The driving styles of drivers may be analyzed in all of these style quadrants: time-free, time-bound, input, and reaction.

The driving style vectors 232, and vector components 234, can also be tailored to detect situations that are highly indicative of style differences—and characteristics that do not differentiate drivers well can be avoided. For example, if driver A has a daily route with a semi-unique turn requirement (e.g. a hairpin turn), one of the vector components might be the turning force or lane starting position applied at that turn. The frequency of driver A making that turn would make the turning force or lane position in that circumstance a good identifier of the driver, as the captured data would be on a daily basis and therefore would have a well-established and trustworthy mean and dispersion.

Some exemplary driving style characteristics include but are not limited to: driver head pose (e.g., yaw), including head pose behavior before, during and after detected events (e.g., a lane change), speed (e.g., average above/below speed limit), following distance (e.g., FCW events, etc.), shifting behavior (e.g., engine speed shift points, RPM shift points, lugging time behavior, etc.), lateral acceleration, blinker usage, lane position and preference (e.g., LDW events, etc.), steering behavior (e.g., hand positioning, sharpness, etc.), acceleration behavior (e.g., throttle usage, etc.), cruise control use, lane change behavior (e.g., frequency, duration, etc.), braking behavior (e.g., engine brake use, etc.), disabling of on-vehicle systems (e.g., LDW, etc.), and any other characteristic of driving style. Some examples of environmental circumstances that can be considered in determining driving style include but are not limited to: the presence of road signs (e.g., stop signs, speed limit signs, etc.), traffic conditions (e.g., congested traffic, accidents, etc.), road conditions (e.g., speed limit on road, road slickness/roughness, etc.), weather conditions (e.g., raining, daytime, nighttime, etc.), and any other circumstance that may affect driving style.

The driving style vectors 232 can be determined for one or more drivers and retrievably stored in the database 220. Such driving style vectors 232 can be associated with the driver identification data (e.g., a unique driver ID, etc.) for the respective drivers.

The driver identification data can be determined via any methodology, including but not limited to, for example, telematics log-in. The driver identification data of the known driver can then be associated with the corresponding driving style vector 232 in the database 220, such that the driving style vector 232 is a stored characterization of the driving style of the known driver. For example, in operation, a first driver A may log-in to the vehicle telematics system for one or more driving excursions. The driving style-based data gathered during the one or more driving excursions of the first driver A may thereafter be used to generate at least one driving style vector 232 that is stored in the database 220 in association with the driver identification data of the first driver A. Driving style-based data and driver identification data may be collected over one or more trips and/or over one or more vehicles. Where driving style data is collected for the same driver over multiple vehicles, separate driving style vectors may be generated and stored for each vehicle driven by that driver, as the vehicles may behave differently (e.g., due to different carried loads, etc.) and thus the driving style of the driver may be different between the vehicles. Statistical majority information may also be used to suppress or remove outlier driving style vectors as potentially mislabeled driving style vectors. Similarly, outlier driving style-based data used in generating the driving style vectors can be suppressed or removed.

The vector components 234 of the driving style vectors 232 may also be updated to account for driving style-based data collected during additional excursions. Accordingly, the DS-DIM 230 may be configured to analyze the additional driving style-based data so as to update the appropriate driving style vector. As more driving style-based data is collected and analyzed for the driver, the associated driving style vector becomes a more accurate representation of the driver's driving style. In other words, more driving style-based data results in more accurate mean and dispersion values for each component of the driving style vectors.

In at least some embodiments, the driver identification data is determined via a comparison of the driving style of the unknown driver to stored driving styles of one or more known drivers (i.e., drivers whose driver identification data are assigned to a stored driving style and/or driving style vector 232). The comparison can be used to identify known drivers with similar driving styles to the driving style of the unknown driver. The similarity between driving styles can indicate the likelihood that the unknown driver is one of the known drivers. The more similar the driving styles are, the more likely the unknown and known drivers are the same driver. The DS-DIM may thereby identity the unknown driver as one of the known drivers based on a determined degree of similarity between driving styles. Such identification may be based on the degree of similarity meeting or exceeding a predetermined identity threshold. The identity threshold may be set to correspond to an absolute value (e.g., the similarity is the absolute value under the max observable) and/or as a relative value (e.g., the similarity with one known driver is more than any other known driver by the relative value).

Accordingly, the DS-DIM 230 may further be configured to determine the degree of similarly (i.e., similarity score) between the detected driving styles of various drivers. The degree of similarly between driving styles may be determined by calculating the angle between associated style vectors. The angle between first driving style vector 232-A and third driving style vector 232-U may be calculated according to the following dot product formula:

$$\theta_{A,U} = \cos^{-1}\left(\frac{A \cdot U}{\|A\|\|U\|}\right),$$

where a smaller calculated angle indicates a higher degree of similarity, with a zero angle indicating identical driving style vectors 232.

TABLE A

|  | Driver U | Driver A |
|---|---|---|
| SDLP (m) | 0.35 | 0.1 |
| Mean Lane Position (m) | 0.2 | 0.5 |
| Mean Steering Frequency (Hz) | 0.32 Hz | 0.1 |

Table A illustrates an exemplary comparison of the driving styles of an unknown driver U to a known driver A for vectors that consider three detected style characteristics: SDLP, mean lane position and mean steering frequency. The calculated degree of similarity for the illustrated comparison would be approximately 53 degrees.

In some embodiments, the degree of similarity may be determined accord to a calculated divergence between the driving styles of the unknown driver and known drivers. The degree of divergence may be calculated on a characteristic-by-characteristic basis. For example, the degree of divergence between first driving style vector 232-A of the known driver and third driving style vector 232-U of the unknown driver may be calculated according to the following formulas for driving style characteristics x, y and z:

$$\Delta_{A,U} = a f_x(x_A, x_U) + b f_y(y_A, y_U) + c f_z(z_A, z_U),$$

where $f_x$, $f_y$ and $f_z$ are respective divergence functions that return scalar values, and a, b and c are weighting coefficients that can be used to weight characteristics that are more/less identifying. The respective functions can be any functions that characterize how changes in the respective driving style characteristic reflect similarities/dissimilarities. For example, for average speed, the divergence function can be that every 10 mph difference in average speed returns a 0.1 value for divergence, such that a 30 mph difference returns a 0.3 value. As another example, for brake-type use, the divergence function can reflect a percentage difference, such that the function returns a 0.33 value where driver A uses engine braking 100% of the time and driver U uses engine braking 75% of the time (the difference of 25% being 33% of 75%). The divergence functions may be nonlinear. For example, a threshold function that outright rejects any too large differences in characteristics may be used.

In some embodiments, known errors in determining the driving style characteristic values may be accounted for by the DS-DIM 230 in determining the degree of similarity. Such errors may include measurement errors, propagation errors, etc. Upper and lower bounds for the degree of similarity may thereby be determined. The dispersion of the vector components may also be accounted for, e.g., using the Mahanalobis distance between vector components as a measure.

In at least one embodiment, one or more known drivers can be identified as probable driver identities, or otherwise excluded as probable driver identities, for the unknown driver based on the determined degree of similarity between the detected driving styles for each. The identification of probable driver identities can be according to a predetermined similarity threshold, such that when the determined similarity between driving styles is above the similarity threshold (e.g., angle between style vectors is low), the known driver can be identified as a probable driver identity for the unknown driver. In some embodiments, where no known drivers are identified as probable driver identities, the determined driving style of the unknown driver can be saved to the database for future analysis and/or driver identity determination.

The DS-DIM 230 may further be configured to rank a plurality of identified probable driver identities. Such ranking may be retrievably stored in the database in association with the determined driving style of the unknown driver (e.g., the driving style vector). The ranking may further be updated to account for updated driving style determinations based on driving style-based data collected during additional excursions. For example, driver A may be initially identified as more probably the driver identity of the unknown driver, versus driver B—but later updates to the respective driving styles can result in driver B being identified as more the more probable driver identity over driver A. The ranking can therefore be a dynamic ranking that can be updated in real-time and/or periodically.

The DS-DIM 230 may further be configured to associate the determined driving styles, driver identities, probable driver identities (ranked and/or unranked) with one or more detected driver and/or vehicle related events, and to store such association in the database. For example, a detected event may be associated with the determined driving style of the unknown driver and a predetermined number of determined probable driver identities. Such association may be further analyzed to identify the unknown driver as one of the known drivers via one or more of the methodologies discussed herein. Accordingly, as shown in FIG. 2, the system architecture 200 may comprise an event detection module 240 configured to detect various events from the event-based data, according to known methodologies.

In at least one embodiment, the probable identities may be used by the vehicle processor and/or server system in addition to other driver identity determinations. Accordingly, as shown in FIG. 2, the system architecture 200 may comprise one or more other driver recognition modules, such as a telematics log-in module 250 and a facial recognition module 260, which may be configured to identify drivers based on other respective driver identification methodologies. The telematics log-in module 250 may be configured to identify drivers via tracking telematics log-in/logouts. The facial recognition module 260 may be configured to identify drivers via facial recognition. Each of these other driver recognition modules may be configured to provide a set of probable driver identities, which may be combined with the driving style identity determinations discussed herein, in order to identify the unknown driver.

For example, in a situation where facial recognition (and/or other known methodologies) returns more than one known driver identity as the possible identities of the unknown driver, the driving style based driver identity determination can be used to identify the unknown driver from among the known drivers returned via facial recognition (and/or other known methodology)—and vice versa. As another example, the facial recognition characteristics can be used as additional vector components to the driving style vector in order to generate an overall identity vector, which can be used to identify unknown drivers in similar manner as the driving style vector.

TABLE B

|  | Facial Recognition Similarity Score | Driving Style Similarity Score |
|---|---|---|
| Driver A | 80 | 70 |
| Driver B | 70 | 82 |
| Driver C | 65 | 80 |
| Driver D | 65 | n/a |
| Driver E | n/a | 85 |

Table B reflects a hypothetical situation in which the facial recognition similarity scores between the unknown driver and drivers A-E are combined with the driving style similarity scores between corresponding drivers. For convenience, the scores are listed as 90 minus the dot product produced angle, so that the larger values reflect a closer match. As can be seen, via the facial recognition methodology, the unknown driver is most likely driver A—whereas the driving style based approach identifies driver E as most likely to be the unknown driver.

The DS-DIM 230 may be configured to combine these and other similarity data sets. Such combination may be according to a weighted sum. For example, giving equal weight results in driver B being identified as the most probable identity for the unknown driver, followed by driver A and then driver C. Different weights may also be given to account for the reliability of the specific methodologies used. Alternatively, a winner-take-all approach may be used, where the largest similarity score among the different approaches and drivers is taken as identifying the unknown driver. Referring again to Table B, this would result in driver E being identified as the unknown driver.

It will be understood that the approaches and methodologies disclosed herein may be used for other similarity measures, such as for example, voiceprint similarity, height and weight similarity, biometric similarity, facial similarity, driving behavior similarity unrelated to driving style (e.g., propensity to listen to/sing with the radio, characteristic interactions with passengers, etc.) and other such measures. One or more of these approaches can work as backstops to the driving style based identification, or vice versa, providing surety against mistaken identity. Moreover, other combination schemes can be used, such as the Dempster-Shafer evidential approach, manual verification, etc.

Returning now to FIG. 2, the system architecture 200 may further comprise a system control module 270 configured to control one or more vehicle systems based on the determined driver identity. In particular, the system control module 270 may deliver a control signal to one or more vehicle control systems 140 based on the determined driver identity. The control signal may instruct the systems 140 to provide one or more types of driver assistance warnings (e.g., warnings relating to braking, obstacle avoidance, etc.) and/or to intervene in the operation of the vehicle to initiate corrective action. A variety of corrective actions may be possible and multiple corrective actions may be initiated at the same time. It will be understood that such corrective actions need not be contemporaneous with detected events and/or event data, and may, additionally or alternatively, be responsive to one or more historical records of detected events and/or event data. For example, the corrective actions may be based on the historical records of the identified driver.

The system control module 270 may further deliver a control signal to one or more notification devices 146, so as to provide warnings and/or notifications externally to the vehicle surroundings and/or internally to the vehicle occupants. Example warnings and/or notifications include: headway time/safe following distance warnings, lane departure warnings, warnings relating to braking and or obstacle avoidance events, and any other type of warning or notification in furtherance of the embodiments described herein. Other vehicle control systems 148 may also be similarly controlled based on the determined driver identity.

Figure 4:
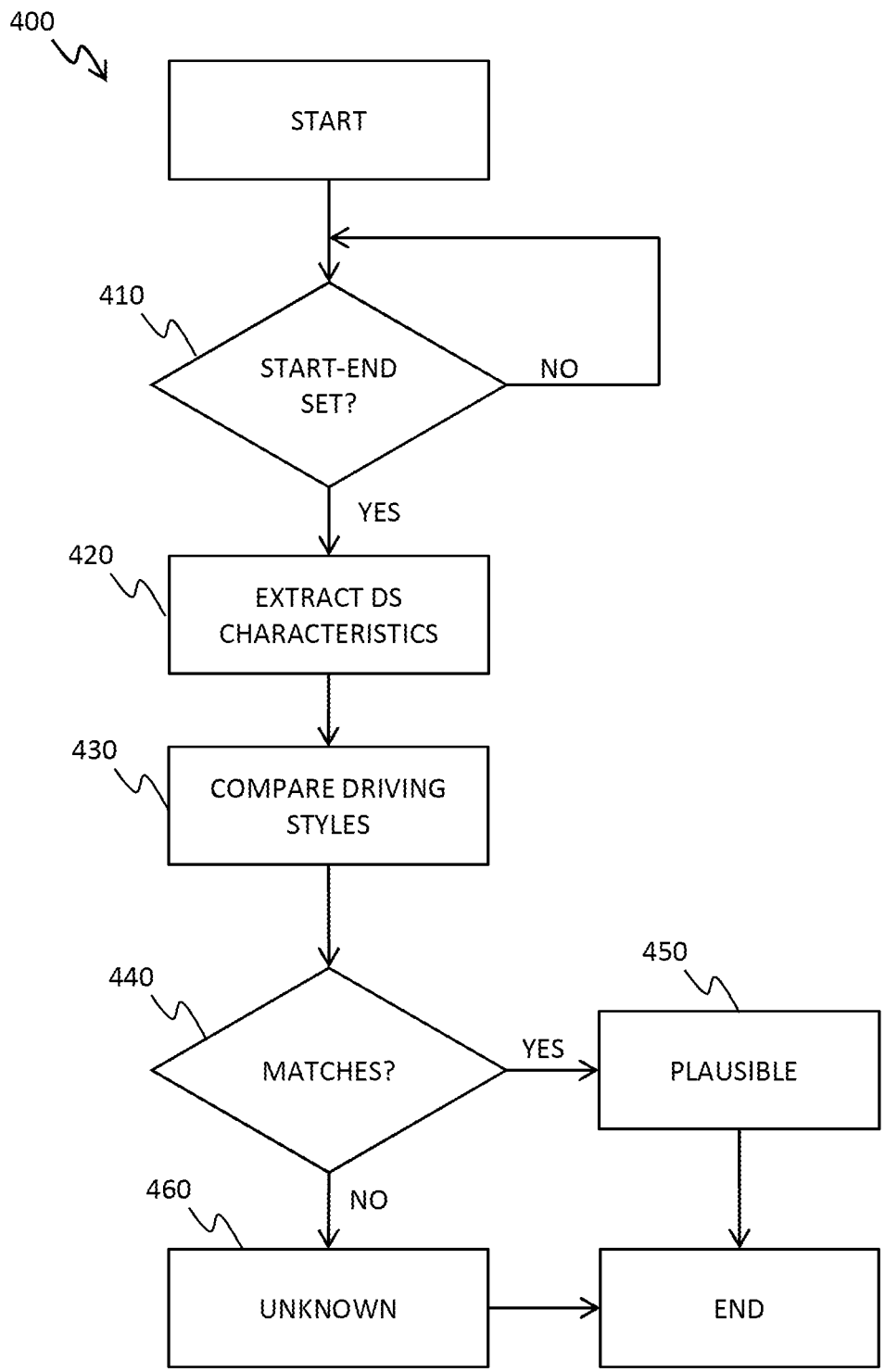
FIG. 4 is a flow-chart illustrating exemplary methods in accordance with one or more aspects of the invention.

FIG. 4 illustrates an exemplary method according to at least one embodiment, in which drivers can be identified by their driving styles.

At step 410, it is determined whether there has been plausible trip-start and trip-end events detected (e.g., engine start followed by park and engine stop). The trip-start and trip-end events are useable to bound the sensor data analyzed for driving style. The trip-start and trip-end events are useful data boundaries to ensure that there is only one driver whose style is being analyzed. Other bounds can be used without limitation for the purpose of bounding the data set analyzed.

At step 420, the bounded data set of driving style-based data is analyzed to extract driving style characteristics of the driver. As discussed herein, the driving style characteristics may correspond to vector component 234 values for one or more driving style vectors 232.

At step 430, the generated driving style vector 232 is compared with a library of previously collected driving style vectors 232 for known drivers, where each of the know driver driving style vectors 232 is associated with corresponding driver identification data. The comparison results in the determination of a degree of similarity/similarity score for each pair of compared driving style vectors, as discussed herein.

At step 440, it is determined whether there are any pairs of compared driving style vectors 232 for which the degree of similarity/similarity score is above the similarity threshold. As discussed herein, this indicates the known driver of the pair is a plausible identity of the unknown driver.

At step 450, where it is determined that one or more degrees of similarity/similarity scores are above the similarity threshold, the driver identity data of the corresponding known drivers is added to a set of plausible identities for the unknown driver. The set of plausible identities is stored in association with the driving style vector 232 of the unknown driver. Where one driver identity is determined with significant confidence (e.g., the similarity score is significantly high and/or is significantly higher than any others), the set of plausible identities can be reduced to the one driver identity.

At step 460, where it is determined that the none of the degrees of similarity/similarity scores are above the similarity threshold, the driving style vector can be stored with an unknown or null identity tag. As discussed herein, the driving style vector of the unknown driver can be later analyzed after additional driving style based data is captured. Moreover, the identity of the unknown driver may be determined via other methodologies (e.g., facial recognition, telematics log-in, via a process of elimination of other known drivers, etc.) and the driving style vector may then be associated with the corresponding driver identity data. The driving style vector of the now known driver can thereafter be stored in the library for later reference.

The embodiments described in detail above are considered novel over the prior art and are considered critical to the operation of at least one aspect of the described systems, methods and/or apparatuses, and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus, if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense, it is therefore contemplated that an equivalent substitution of two or more elements may be made for any one of the elements described and its various embodiments or that a single element may be substituted for two or more elements.

Changes from the subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

Furthermore, the functionalities described herein may be implemented via hardware, software, firmware or any combination thereof, unless expressly indicated otherwise. If implemented in software, the functionalities may be stored in a memory as one or more instructions on a computer readable medium, including any available media accessible by a computer that can be used to store desired program code in the form of instructions, data structures or the like. Thus, certain aspects may comprise a computer program product for performing the operations presented herein, such computer program product comprising a computer readable medium having instructions stored thereon, the instructions being executable by one or more processors to perform the operations described herein. It will be appreciated that software or instructions may also be transmitted over a transmission medium as is known in the art. Further, modules and/or other appropriate means for performing the operations described herein may be utilized in implementing the functionalities described herein.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A system for controlling a vehicle based on a driving style determined driver identity, comprising:
   one or more sensors configured to capture driving-style-based data characterizing a driving style of an unknown driver;
   at least one control unit configured to:
      determine a driving style vector of the unknown driver from the captured driving-style-based data;
      compare the driving style vector of the unknown driver to driving style vectors of a plurality of known drivers so as to generate a similarity score for each of the plurality of known drivers compared to;
      rank at least a subset of the plurality of known drivers according to their respective similarity scores;
      determine a probable identity of the unknown driver as at least one of the ranked known drivers based on the respective similarity scores; and
      control at least one vehicle system based on the determined probable identity of the unknown driver.

2. The system of claim 1, further comprising:
   a secondary driver identification system configured to determine the probable identity of the unknown driver as at least one of the plurality of drivers based on at least one of: biometric data and telematics log-in data,
   wherein the control unit determines the probable identity of the unknown driver as at least one of the ranked known drivers based on both of: (a) the respective similarity scores, and (b) the secondary driver identification system determined probable identity of the unknown driver.

3. The system of claim 1, wherein the driving style vectors consist of a plurality of vector components, each vector component reflecting a predetermined driving style characteristic.

4. The system of claim 3, wherein at least one vector component reflects a time-free driving style characteristic.

5. The system of claim 3, wherein at least one vector component reflects a time-bound driving style characteristic.

6. The system of claim 3, wherein at least one vector component reflects a paired input-and-reaction driving style characteristic.

7. The system of claim 1, wherein the control unit determines the probable identity of the unknown driver as at least one of the ranked known drivers based on the respective similarity scores exceeding a predetermined threshold.

8. The system of claim 1, wherein the control unit determines the probable identity of the unknown driver as the highest ranked known driver.

9. The system of claim 1, further comprising:
   a database configured to store the driving style vector in association with the determined probable identity of the unknown driver.

10. The system of claim 9, wherein the database is further configured to store the driving style vector in association with the ranked known drivers.

11. A method for controlling a vehicle based on a driving style determined driver identity, comprising:
   capturing, via one or more sensors, driving-style-based data characterizing a driving style of an unknown driver;
   determining a driving style vector of the unknown driver from the captured driving-style-based data;
   comparing the driving style vector of the unknown driver to driving style vectors of a plurality of known drivers so as to generate a similarity score for each of the plurality of known drivers compared to;
   ranking at least a subset of the plurality of known drivers according to their respective similarity scores;
   determining a probable identity of the unknown driver as at least one of the ranked known drivers based on the respective similarity scores; and
   controlling at least one vehicle system based on the determined probable identity of the unknown driver.

12. The method of claim 11, further comprising:
   determining, via a secondary driver identification system, the probable identity of the unknown driver as at least one of the plurality of drivers based on at least one of: biometric data and telematics log-in data,
   wherein determining the probable identity of the unknown driver as at least one of the ranked known drivers is based on both of: (a) the respective similarity scores, and (b) the secondary driver identification system determined probable identity of the unknown driver.

13. The method of claim 11, wherein the driving style vectors consist of a plurality of vector components, each vector component reflecting a predetermined driving style characteristic.

14. The method of claim 13, wherein at least one vector component reflects a time-free driving style characteristic.

15. The method of claim 13, wherein at least one vector component reflects a time-bound driving style characteristic.

16. The method of claim 13, wherein at least one vector component reflects a paired input-and-reaction driving style characteristic.

17. The method of claim 11, wherein determining the probable identity of the unknown driver as at least one of the ranked known drivers is based on the respective similarity scores exceeding a predetermined threshold.

18. The method of claim 11, wherein the probable identity of the unknown driver is determined as the highest ranked known driver.

19. The method of claim 11, further comprising:
  storing, in a database, the driving style vector in association with the determined probable identity of the unknown driver and the ranked known drivers.

* * * * *